(12) United States Patent
Hellige et al.

(10) Patent No.: US 11,837,856 B2
(45) Date of Patent: Dec. 5, 2023

(54) BUSHING HOUSING

(71) Applicant: HARTING Electric Stiftung & Co. KG, Espelkamp (DE)

(72) Inventors: Denny Hellige, Bad Oeyenhausen (DE); Ensign Wen, Zhuhai (CN); Walter Gerstl, Breitenfurt bei Wien (AT)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 311 days.

(21) Appl. No.: 17/294,792

(22) PCT Filed: Jan. 15, 2020

(86) PCT No.: PCT/DE2020/100021
§ 371 (c)(1),
(2) Date: May 18, 2021

(87) PCT Pub. No.: WO2020/156610
PCT Pub. Date: Aug. 6, 2020

(65) Prior Publication Data
US 2021/0408774 A1   Dec. 30, 2021

(30) Foreign Application Priority Data

Jan. 29, 2019 (CN) .......................... 201910083940.4

(51) Int. Cl.
*H02G 3/08* (2006.01)
*H02G 3/10* (2006.01)
(Continued)

(52) U.S. Cl.
CPC ............... *H02G 3/085* (2013.01); *H02G 3/10* (2013.01); *H02G 3/16* (2013.01); *H02G 3/18* (2013.01); *H02G 3/22* (2013.01)

(58) Field of Classification Search
CPC .......... H02G 3/08; H02G 3/081; H02G 3/083; H02G 3/10; H02G 3/16; H02G 3/22;
(Continued)

(56) References Cited

U.S. PATENT DOCUMENTS 5,783,774 A * 7/1998 Bowman ................ H02G 3/185
174/487
6,004,162 A 12/1999 Harting et al.
(Continued)

FOREIGN PATENT DOCUMENTS

CN    104041066 A    9/2014
DE    202010008934 U1    2/2012
(Continued)

OTHER PUBLICATIONS

Weidmulleruk, "WOW" Our compact, high-current, connector system for rail engineering applications, Weidmüller UK, Aug. 27, 2014, https://weidmulleruk.wordpress.com/2014/08/27/wow-our-compact-high-current-connector-system-for-rail-engineering-applications/.

*Primary Examiner* — Angel R Estrada
(74) *Attorney, Agent, or Firm* — Smartpat PLC

(57) ABSTRACT

A bushing housing (1) for leading one or more lines and/or cables out of or into a closed area comprises a housing member (2) and a matching removable housing cover (3). The housing member (2) has a breakthrough hole (5) and at least one exit hole (6, 6'), the planes of which extend substantially perpendicularly to each other.

12 Claims, 4 Drawing Sheets

(51) Int. Cl.
*H02G 3/16* (2006.01)
*H02G 3/18* (2006.01)
*H02G 3/22* (2006.01)

(58) Field of Classification Search
CPC .......... H05K 5/02; H05K 5/00; H05K 5/0004; H05K 5/0217; H05K 5/0247; H05K 5/04
USPC ....... 174/480, 481, 50, 53, 57, 58, 520, 559, 174/535; 220/3.2–3.9, 4.02; 361/600, 361/601; 248/906, 68.1, 49; 285/149.1, 285/154.1, 125.1, 126.1
See application file for complete search history.

(56) References Cited

U.S. PATENT DOCUMENTS

| | | | | |
|---|---|---|---|---|
| 6,527,302 | B1 * | 3/2003 | Gault | F16L 41/03 |
| | | | | 174/50 |
| 6,733,345 | B2 * | 5/2004 | Weise | H01R 9/24 |
| | | | | 174/50 |
| 7,439,442 | B2 * | 10/2008 | Schutte | F21V 15/01 |
| | | | | 174/53 |
| 8,642,885 | B2 * | 2/2014 | Davila | H02G 3/086 |
| | | | | 174/50 |
| 8,686,287 | B1 * | 4/2014 | Gretz | H02G 3/123 |
| | | | | 174/50 |
| 8,701,911 | B2 * | 4/2014 | Youssef | H02G 3/12 |
| | | | | 174/481 |
| 8,901,417 | B2 * | 12/2014 | Herring | H05K 5/0217 |
| | | | | 174/50 |
| 8,952,252 | B2 * | 2/2015 | Bugaris | H02B 13/025 |
| | | | | 174/50 |
| 9,035,175 | B2 * | 5/2015 | Korcz | H02G 3/12 |
| | | | | 174/50 |
| 2013/0084050 | A1 | 4/2013 | Vastmans et al. | |
| 2013/0337680 | A1 | 12/2013 | Schlegel | |
| 2016/0241007 | A1 | 8/2016 | Tremaine et al. | |

FOREIGN PATENT DOCUMENTS

| | | |
|---|---|---|
| DE | 102011001064 | 4/2012 |
| EP | 0860906 B1 | 5/2004 |
| EP | 2845277 A2 | 3/2015 |
| JP | 2002095141 A | 3/2002 |

* cited by examiner

BUSHING HOUSING

CROSS-REFERENCE TO RELATED APPLICATION

This application is a national stage application, filed under 35 U.S.C. § 371, of International Patent Application No. PCT/DE2020/100021, filed on Jan. 15, 2020, which claims the benefit of Chinese Patent Application No. 201910083940.4, filed Jan. 29, 2019.

TECHNICAL FIELD

The disclosure relates to a bushing housing. Bushing housings are used for routing lines or cables, respectively, from a closed region into another region, or vice versa.

BACKGROUND

EP 2 845 277 A2 shows a bushing housing which is disposed on an electrical functional group. The bushing housing is composed of a housing lower part and a housing upper part. Clearances, in which a plurality of cable conduit seals for routing cables therethrough are disposed, are provided in the housing lower part. The direction of routing cables in and the direction of routing cables out in this bushing housing assume a mutual angle of more than 90°. Such an arrangement requires a lot of space. A dedicated clearance is provided for each cable so that the number of required cables has to be previously agreed and known. The bushing housing, on account thereof, is not able to be used in a flexible manner for all functional groups or apparatuses, respectively.

SUMMARY

The object of the disclosure lies in providing a flexible and space-saving bushing housing. The object is achieved by the subject matter as claimed. Advantageous design embodiments of the invention are set forth in the dependent claims.

The bushing housing serves for routing one or a plurality of lines and/or cables into or out of a closed region. The closed region herein has a casing which has at least one wall on which the bushing housing can be assembled. The lines can be, for example, current conductors with a large cross section. However, pneumatic lines or fiber optics are likewise conceivable. The cables can be multicore cables, for example. The invention is not limited to the type of lines or cables. The terms lines and cables are potentially also used synonymously in the context of the present application.

The bushing housing is composed of a housing body and a matching housing cover. Matching in this context means that the housing body is completely closed by the housing cover and the bushing housing encloses a cavity which is shielded in relation to the rest of the environment. The housing cover is removable and can be fastened in a captive and reversible manner to the housing body by way of fastening means. In the removed state, the housing cover permits comfortable access to the cutout opening and the exit opening within the housing body. The housing cover is configured in the manner of a hood and designed such that the cutout opening as well as the exit opening, or the exit openings, respectively, can be easily reached by hand.

The housing body has a cutout opening and at least one exit opening. The cutout opening typically correlates with a cutout into a closed region. In this case, the closed region is a car of a rail vehicle or the rail vehicle per se. The cutout in this instance is situated on a wall of the car or of the rail vehicle. Accordingly, two cars can be connected to one another in electrical and data technology terms with the aid of two bushing housings.

The plane in which the cutout opening is situated and the plane in which the exit opening is situated are aligned so as to be substantially perpendicular to one another. This arrangement permits a particularly space-saving routing of the lines or cables, respectively, within the bushing housing.

The housing body preferably has exactly one cutout opening and exactly two exit openings. The cables or lines, respectively, which run into the bushing housing through the cutout opening can be distributed to the two exit openings within the bushing housing. In this case, the bushing housing functions as a so-called Y-distributor. The conductors and/or cables which run into the bushing housing are disposed so as to be approximately perpendicular to the lines and/or cables which (by way of plug connectors) are connected to the bushing housing.

The planes of the exit openings are preferably aligned so as to be mutually parallel and are vertically spaced apart from one another. If the bushing housing is fastened to a wall, it can be said that the exit openings are laterally mutually offset, that is to say are at different spacings from the wall. The exit opening that is more remote from the wall is disposed above the exit opening that is disposed closer to the wall. The planes of the exit openings here are in each case preferably aligned so as to be substantially perpendicular to the cutout opening. This arrangement has proven to be particularly compact and space-saving.

In one particularly preferred design embodiment, the housing body on the external side thereof has an encircling groove along the cutout opening. The groove is provided for receiving a seal and for sealing the bushing housing in a media-tight manner on the wall.

The bushing housing preferably has openings for fastening to a wall. The bushing housing can be screwed to a wall by way of the openings, for example. These openings are preferably provided on the housing body as well as on the housing cover. In order for the housing cover to be removed, the screws on the housing cover first have to be removed in this instance. The openings of the housing cover then additionally assume a locking function between the housing body and the housing cover.

The bushing housing is advantageously composed of metal. As a result, the shielding properties of the bushing housing are enhanced, in particular in relation to electromagnetic fields. The bushing housing is at least in portions provided with a paint coating. This paint coating serves in particular to protect against corrosion, but at the same time amplifies the modern and slimline design of said bushing housing.

In one particularly advantageous design embodiment, the housing body of the bushing housing is without paint between the encircling groove and the cutout opening. In this case, the bushing housing is painted only in regions, thus not completely painted. The region between the encircling groove and the cutout opening in the screw-fitted state is in direct physical contact with the wall. In the case of a metallic wall, a conducting connection between the bushing housing and the wall can be established by way of said physical contact, this being associated with advantages in terms of electrical grounding.

It is particularly advantageous for the bushing housing to have fastening means for fastening a holding frame of a modular plug connector system and/or a plug connector. Holding frames are known from EP 0 860 906 B1, for example. The holding frames are usually equipped with plug connector modules of identical types and/or different types. The holding frames thus serve for receiving a plurality of mutually identical and/or else different plug connector modules and for securely fastening the latter in the bushing housing.

The bushing housing in the region of the exit opening has threaded openings for fastening the holding frames, the latter with the aid of said threaded openings being able to be fixed within the exit opening. The exit opening, conjointly with the holding frame equipped with plug connector modules, represents a connector socket for a plug connector.

The plug connector modules typically have in each case a substantially cuboid insulating body, or a cuboid housing, respectively. These insulating bodies or housings, respectively, can serve as carriers for contacts and receive and fix contacts of various types, for example. The function of a plug connector formed as a result thereof is thus very flexible. For example, pneumatic modules, optical modules, modules for transmitting electric power and/or electric analog and/or digital signals can be received in the respective insulating body or housing, respectively, and in this way be used in the modular system of the plug connector. Plug connector modules are also increasingly assuming tasks in the field of measurement technology and data transmission.

It is however also possible for complete plug connectors, in particular plug connectors for transmitting strong currents, to be fixed in the bushing housing. The plug connectors are also fixed in the region of the exit opening and here form a connection point for a mating connector. Such a plug connector is illustrated in DE 10 2011 001 064 B3, for example.

BRIEF DESCRIPTION OF THE DRAWINGS

An exemplary embodiment is illustrated in the drawings and will be explained in more detail hereunder.

DETAILED DESCRIPTION

The figures to some extent include simplified schematic illustrations. In some instances, identical reference signs are used for the same but potentially non-identical elements. Different views of the same elements could be to different scales.

Figure 1:
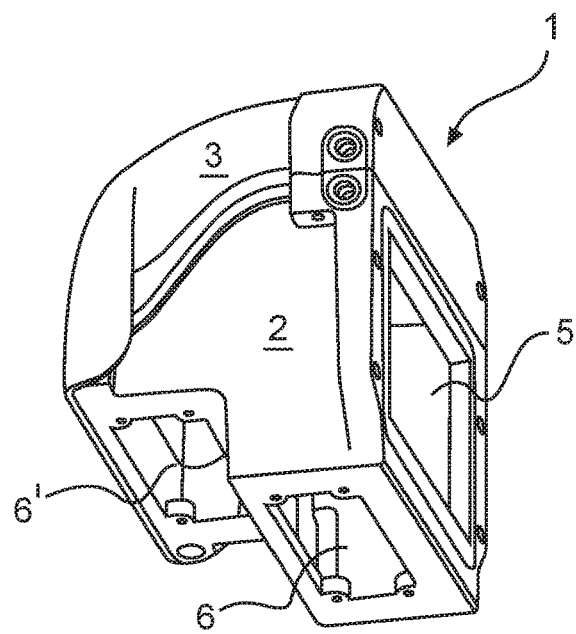
FIG. 1 shows a perspective illustration of a bushing housing.
Figure 2:
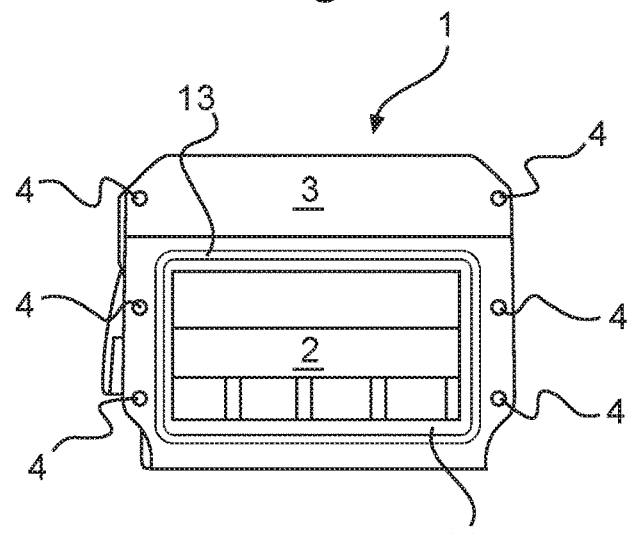
FIG. 2 shows a plan view of the rear side of the bushing housing.
Figure 3:
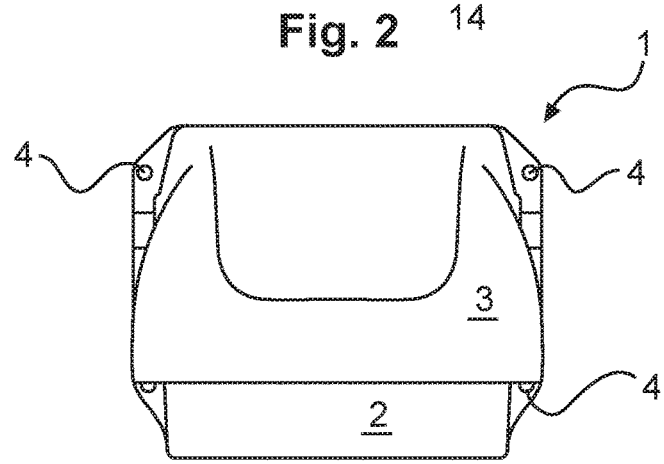
FIG. 3 shows a plan view of the front side of the bushing housing.

FIGS. 1 to 3 show in each case a bushing housing 1. The bushing housing 1 is typically used in the railroad sector and serves for connecting two regions, these typically being two cars, to one another in terms of power and signal technology. The bushing housing 1 is designed in two parts and has a housing body 2 and a matching, convex housing cover 3. The bushing housing 1 has openings 4 for fastening the bushing housing 1 to a wall of a car (not shown for reasons of illustration).

The bushing housing 1 has a substantially rectangular cutout opening 5. The cutout opening 5 can be seen in a plan view in FIG. 2. The bushing housing 1 by way of the cutout opening 5 is directed toward the abovementioned wall and there correlates with a cutout opening that is situated in the wall. The bushing housing 1 has two substantially rectangular exit openings 6. The plane in which the cutout opening 5 is situated and the planes in which the exit openings 6, 6' are in each case situated are perpendicular to one another.

The lines and/or cables which are situated in one region are introduced into the cutout opening 5 in the entry direction E. The lines and/or cables in said cutout opening 5 are connected to plug connector modules (not shown) and/or plug connectors (not shown) which within the housing body 2 are disposed in the region of the exit openings 6. Said lines and/or cables here form a possibility for connecting plug connectors 7 which are plug-fitted to the bushing housing 1 so that the currents and/or signals of the lines and/or of the cables exit the bushing housing 1 in the exit direction A. The plug connectors 7 are reversibly fastened to the bushing housing 1 with the aid of a locking bracket 8. The entry direction E and the exit direction A, exactly like the abovementioned planes of the cutout opening 5 and the exit openings 6, 6', are mutually perpendicular.

Figure 6:
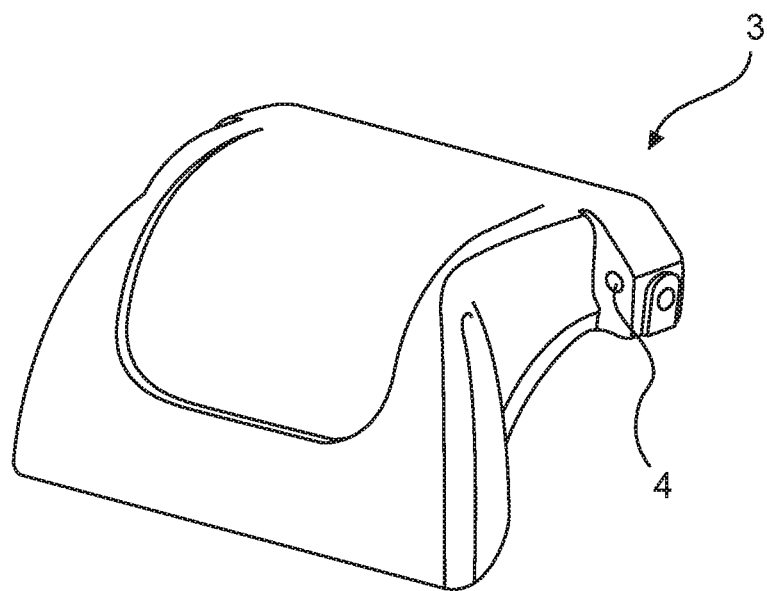
FIG. 6 shows a perspective illustration of a housing cover of the bushing housing.
Figure 7:
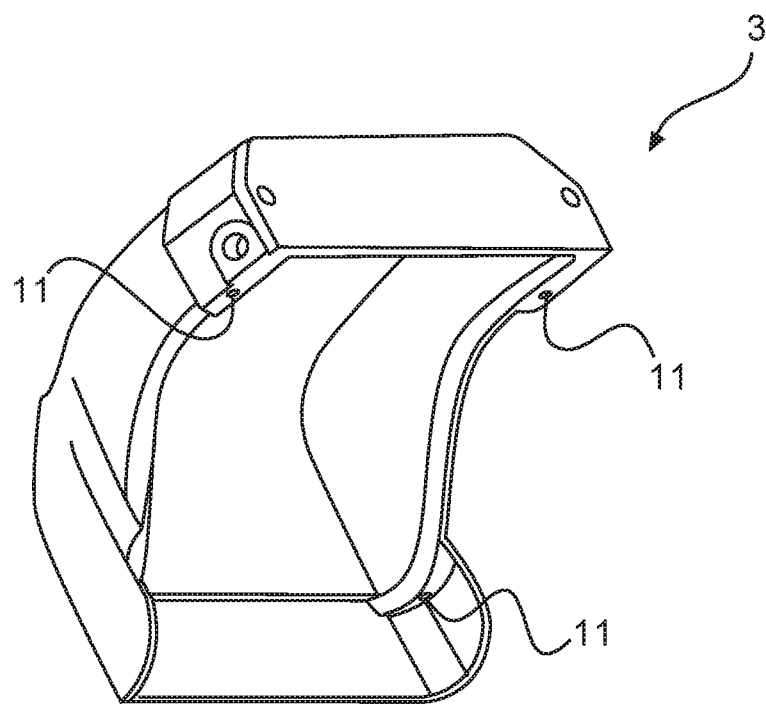
FIG. 7 shows a further perspective illustration of the housing cover of the bushing housing.

The housing cover 3 of the bushing housing is in each case illustrated in a perspective manner in FIGS. 6 and 7. The special hood shape of the housing cover 3 enables a generous access opening 12 to be designed, said access opening 12 offering a lot of space during the installation or wiring, respectively.

Figure 4:
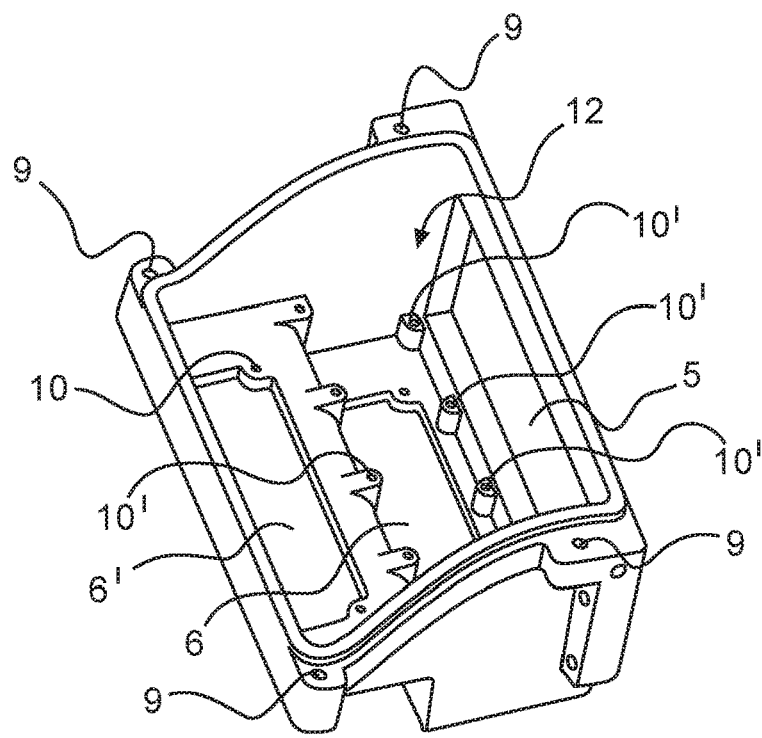
FIG. 4 shows a perspective illustration of a housing body of the bushing housing.
Figure 5:
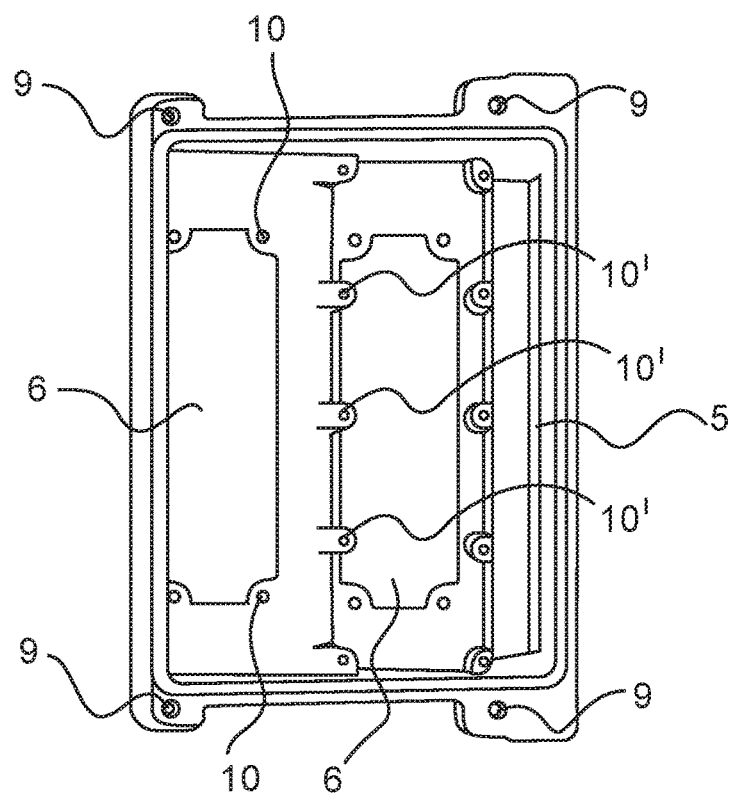
FIG. 5 shows a further perspective illustration of the housing body of the bushing housing.

The housing body 2 of the bushing housing 1 is illustrated in a perspective manner without the housing cover 3 in FIGS. 4 and 5. When the housing cover 3 is removed from the bushing housing 1, a technician can readily access the cutout opening and the cables and/or lines routed through the latter. Said technician can correspondingly connect the lines and/or cables to plug connector modules and/or plug connectors and fasten the latter in the region of the exit openings 6, 6'. To this end, threaded openings 10, 10' are provided in the region of the exit openings 6, 6'. Openings 9 which correlate with threaded openings 11 of the housing cover 3 are provided along the access opening 12 in the housing body 2. As a result thereof the housing cover 3 can be fastened in a captive and reversible manner to the housing body 2.

The exit openings 6, 6' are vertically spaced apart from one another. The lower exit opening 6 is positioned closer to the wall. The upper exit opening 6' is more remote from the wall. This arrangement further enhances the comfortable installation of the bushing housing 1. Both exit openings 6, 6' can be easily reached for the conductors and/or cables to be connected.

The housing body 2 has an encircling groove 13 about the cutout opening 5. A seal for sealing the corresponding cutouts or openings, respectively, of the wall and the bushing housing 1 in relation to the ingress of media is placed into the groove 13.

Figure 8:
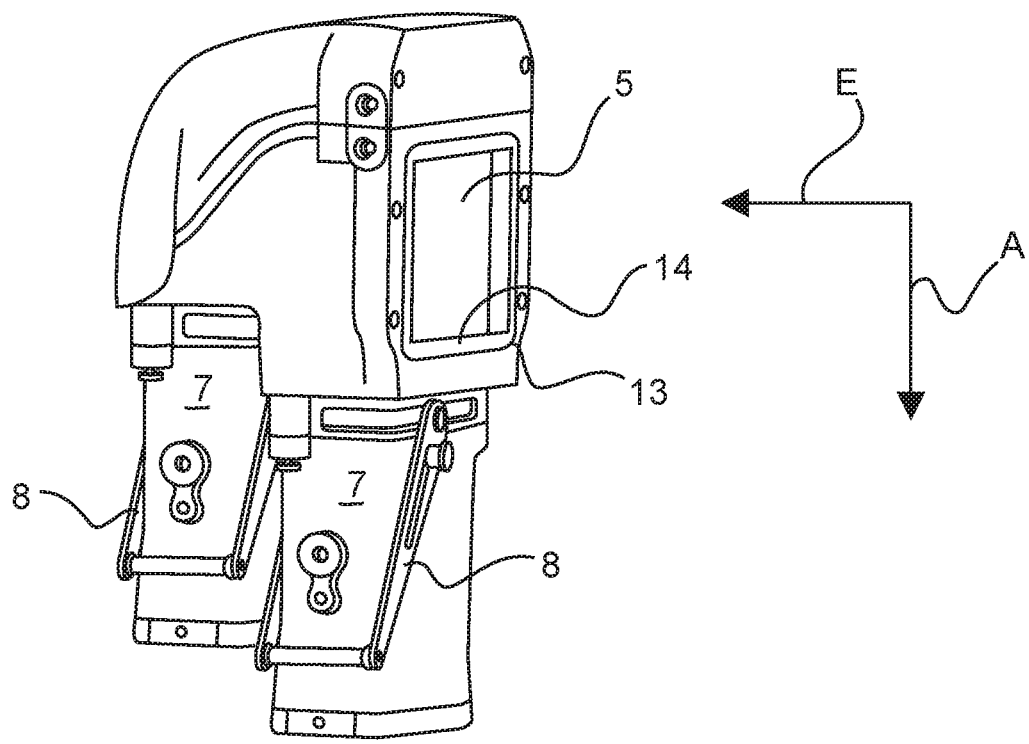
FIG. 8 shows a perspective illustration of the bushing housing, two plug connectors being plugged into said bushing housing.
Figure 9:
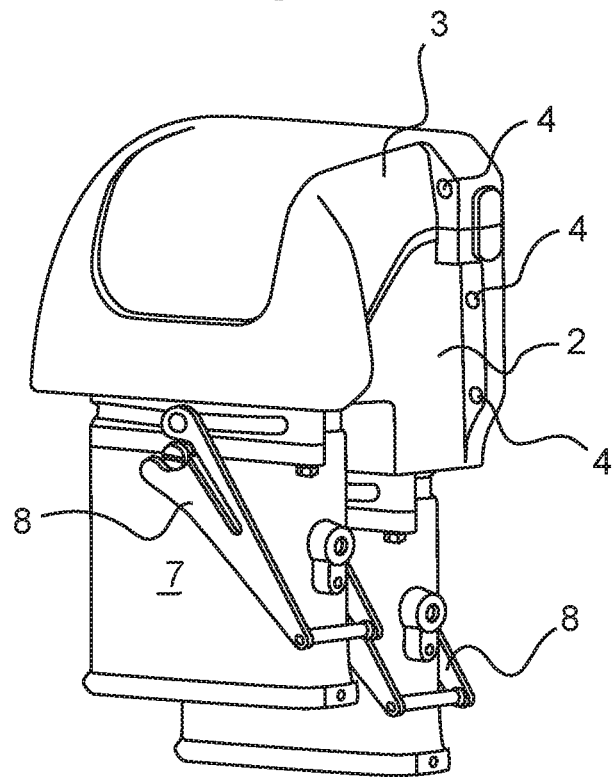
FIG. 9 shows a further perspective illustration of the bushing housing, two plug connectors being plugged into said bushing housing.

The bushing housing 1 is almost completely provided with a paint coating. Only the housing body 2 has a paint-free region 14. The paint-free region 14 is disposed between the encircling groove 13 and the cutout opening 5, as can be seen in FIGS. 2 and 8.

While various aspects or features of the invention are in each case shown in combination in the figures, the combinations illustrated and discussed are not the only possible combinations. In particular, mutually corresponding units or sets of features from different exemplary embodiments can be interchanged with one another.

1 Bushing housing
2 Housing body
3 Housing cover
4 Opening
5 Cutout opening
6 Exit opening
7 Plug connector
8 Locking bracket
9 Opening
10 Threaded opening
11 Threaded opening
12 Access opening
E: Entry direction
A: Exit direction

The invention claimed is:

1. A bushing housing (1) for routing one or more lines and/or cables out of or into a closed region, comprising:
   a housing body (2); and
   a matching, removable housing cover (3),
   wherein the housing body (2) has
      a cutout opening (5) and
      two exit openings (6, 6'),
      the cutout opening (5) and the two exit openings (6, 6') being arranged in planes which are substantially perpendicular to one another, and
   wherein a first of the two exit openings (6) is arranged in a first plane and a second of the two exit openings (6') is arranged in a second plane, the first plane and the second plane being aligned so as to be mutually parallel and vertically spaced apart from one another, and
   wherein the first of the two exit openings (6) is arranged closer to the cutout opening (5) than the second of the two exit openings (6'), and
   wherein the first plane is arranged below the second plane.

2. The bushing housing as claimed in claim 1,
   wherein the housing body (2) has an access opening (12) which permits access to the cutout opening (5) and the two exit openings (6, 6').

3. The bushing housing as claimed in claim 1,
   wherein the housing body (2) has an encircling groove (13) along the cutout opening (5) capable of receiving a seal.

4. The bushing housing as claimed in claim 1,
   wherein the bushing housing (1) has openings (4) for fastening the bushing housing (1) to a wall.

5. The bushing housing as claimed in claim 4,
   wherein the housing body (2) and the housing cover (3) have openings (4) for fastening the bushing housing (1) to a wall.

6. The bushing housing as claimed in claim 1,
   wherein the bushing housing (1) is composed of metal and is at least in portions provided with a paint coating.

7. The bushing housing as claimed in claim 3,
   wherein the bushing housing (1) is composed of metal and is at least in portions provided with a paint coating, and
   wherein the housing body (2) has a paint-free region (14) which is disposed between the encircling groove (13) and the cutout opening (5).

8. The bushing housing as claimed in claim 1,
   wherein the removable housing cover (3) is convex.

9. A railroad car comprising the bushing housing as claimed in claim 1 fastened to a wall thereof.

10. A bushing housing (1) for routing cables out of or into a railroad car, comprising:
    a housing body (2); and
    a convex housing cover (3) arranged to cover an upwardly and forwardly open access opening (12),
    wherein the housing body (2) has
       a cutout opening (5) formed in a rear of the housing body (2) configured to face a wall of the railroad car and
       a downwardly open exit opening (6),
    wherein the cutout opening (5) and the downwardly open exit opening (6) are arranged in planes which are substantially perpendicular to one another.

11. The bushing housing (1) as claimed in claim 10,
    wherein the cutout opening (5) is substantially rectangular, and
    wherein the exit opening (6) is substantially rectangular.

12. A bushing housing (1) for routing cables out of or into a railroad car, comprising:
    a rearwardly open cutout opening (5) facing a wall of the railroad car;
    an upwardly and forwardly open access opening (12);
    a lower downwardly open exit opening (6) arranged proximal to the wall of the railroad car; and
    an upper downwardly open exit opening (6) arranged distal to the wall of the railroad car.

* * * * *